US009098356B2

(12) United States Patent
Lee (10) Patent No.: US 9,098,356 B2
(45) Date of Patent: Aug. 4, 2015

(54) HOOK RE-ENTRY PREVENTION DEVICE AND RECORDING MEDIUM, IN WHICH PROGRAM FOR EXECUTING METHOD THEREOF IN COMPUTER IS RECORDED THEREON

(75) Inventor: Hyung-Joo Lee, Seoul (KR)

(73) Assignee: FASOO.COM CO., LTD, Seoul (KR)

( * ) Notice: Subject to any disclaimer, the term of this patent is extended or adjusted under 35 U.S.C. 154(b) by 17 days.

(21) Appl. No.: 13/818,054

(22) PCT Filed: Aug. 18, 2011

(86) PCT No.: PCT/KR2011/006062
§ 371 (c)(1),
(2), (4) Date: Feb. 20, 2013

(87) PCT Pub. No.: WO2012/023809
PCT Pub. Date: Feb. 23, 2012

(65) Prior Publication Data
US 2013/0160033 A1    Jun. 20, 2013

(30) Foreign Application Priority Data

Aug. 20, 2010 (KR) .................. 10-2010-0080926

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)
*G06F 11/30* (2006.01)

(52) U.S. Cl.
CPC .............. *G06F 9/541* (2013.01); *G06F 9/4425* (2013.01); *G06F 9/545* (2013.01); *G06F 11/302* (2013.01); *G06F 11/3017* (2013.01); *G06F 11/3089* (2013.01); *G06F 2209/542* (2013.01)

(58) Field of Classification Search
CPC ....... G06F 9/541; G06F 9/4425; G06F 9/545; G06F 2209/542; G06F 11/302; G06F 11/3017; G06F 11/3089
USPC ........................................................ 719/328
See application file for complete search history.

(56) References Cited

U.S. PATENT DOCUMENTS 5,974,549 A * 10/1999 Golan ............................ 726/23
6,148,325 A * 11/2000 Schmidt et al. ............... 718/107

(Continued)

FOREIGN PATENT DOCUMENTS

JP      2013-524794      1/2014

OTHER PUBLICATIONS

Christof Fetzer, A Flexible Generator Architecture for Improving Software Dependability,Proceedings of the 13 th International Symposium on Software Reliability Engineering, 2002, Florham Park, NJ.

*Primary Examiner* — Timothy A Mudrick
(74) *Attorney, Agent, or Firm* — William Park & Associates Ltd.

(57) ABSTRACT

Disclosed are a hook re-entry prevention device and a recording medium, in which a program for executing the method thereof in a computer is recorded thereon. A state information management module sets or releases a state information flag which indicates whether a hook function is called. If the state information flag is set when the hook function is called, a re-entry prevention module determines that the calling of the hook function has been conducted from the inside of a hook layer and returns a value to a system layer. According to the present invention, an entry/breakaway layer which is independent from the hook layer functions in such a manner that the hook layer is safely isolated from the hook, thereby preventing hook re-entry caused by the callback of an original function of a lower function while a hook routine within the hook layer is performed during a dynamic API hooking.

8 Claims, 8 Drawing Sheets

(56) References Cited

U.S. PATENT DOCUMENTS

| | | | |
|---|---|---|---|
| 7,607,173 B1* | 10/2009 | Szor et al. | 726/25 |
| 2004/0237071 A1* | 11/2004 | Hollander et al. | 717/124 |
| 2005/0165902 A1* | 7/2005 | Hellenthal et al. | 709/217 |
| 2008/0016339 A1 | 1/2008 | Shukla | |
| 2008/0059676 A1 | 3/2008 | Archer et al. | |
| 2010/0050257 A1 | 2/2010 | Jin | |
| 2010/0107014 A1 | 4/2010 | Shochat et al. | |

* cited by examiner

HOOK RE-ENTRY PREVENTION DEVICE AND RECORDING MEDIUM, IN WHICH PROGRAM FOR EXECUTING METHOD THEREOF IN COMPUTER IS RECORDED THEREON

TECHNICAL FIELD

The present invention relates to a hook re-entry prevention device and a recording medium recording a program for executing a hook re-entry prevention method on a computer and, more particularly, to a device for preventing the recursive entry of a hook while calling a function upon API hooking, and a recording medium recording a program for executing a hook re-entry prevention method on a computer.

BACKGROUND ART

Figure 1:
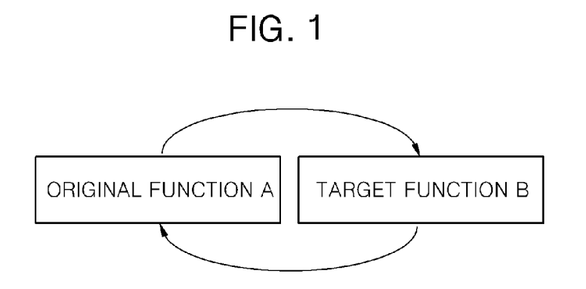
FIGS. 1 and 2 are diagrams illustrating a basic call structure and an API filtering process based on a hook, respectively.
Figure 2:
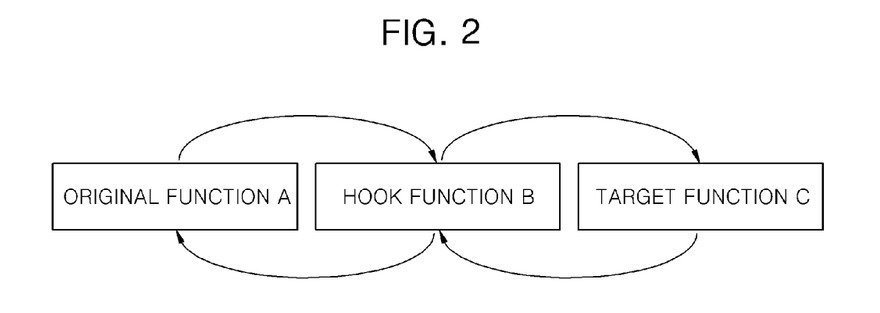

API hooks collectively refer to techniques that bypass the call flow of a function to another location through specific manipulation with regard to a general API call process. FIGS. 1 and 2 illustrate a basic call structure, and an API filtering process based on a hook. As illustrated in FIG. 2, a hook function B intervenes in a process in which a target function C is called by an original function A. A hook layer that is introduced in order to fully realize the hook technique should not be influenced by a hook.

Figure 3:
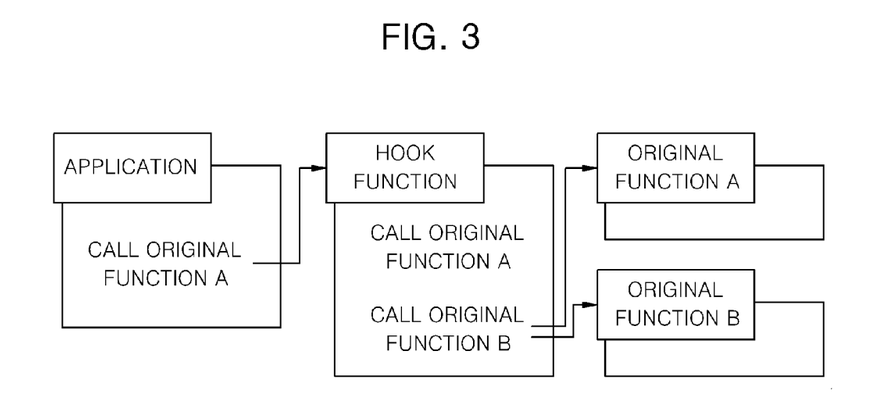
FIG. 3 is a diagram illustrating the ideal structure of a hook layer.

The ideal structure of a hook layer, such as that shown in FIG. 3, should provide support so that hook and substitution/filtering processing can be performed in connection with a plurality of functions. The hook layer itself should not be influenced by the hook. In order to support such a structure, a hook layer should not use a hook target API, or should clearly know addresses used to call hook target API original functions and selectively call a hook API and an original API as desired. When the hook layer does not use the hook target API, an operation inside the hook layer has nothing to do with an API hook. However, it is not easy to prevent the hook layer from using the hook target API. That is, the case in which the hook layer does not use the hook target API is possible only when there is no direct connection between the hook target API and a run time binary for a lower original function. Accordingly, since it is necessary to implement an emulator for supporting program operation on a heterogeneous OS platform or the form of emulating a hook API, this scheme is not suitable for the implementation of a hook layer.

For the above-described reason, a conventional implementation is made such that a hook layer manages addresses used to call hook target API original functions. Additionally, the hook layer is prevented from being influenced by the hook by additionally using auxiliary methods. Here, the programming scheme for implementing a hook layer in the form of managing addresses used to call hook target API original functions varies depending on the technique of the API hook. First, there is a method of performing no hook on modules that belong to a hook layer and lower layers by performing a hook exception on a unit runtime module, such as *.exe or *.dll, that belongs to the hook layer when a function address that is called by an API caller, such as an IAT hook, is modified. A condition that is required in this method is that runtime modules that belong to a hook layer should be accurately identified. Next, there is a method of configuring a hook layer by causing all runtime modules belonging to a hook layer to know addresses used to call the original functions of a hook target API and to call appropriate addresses at a program step. In this method, all runtime modules that belong to the hook layer should know the accurate list and addresses of APIs in which hooks are being performed.

However, in reality, there is a problem in that it is not easy to implement management/programming that can fulfill requirements for configuration of an ideal hook layer. As an example, when module-based exception handling is performed, there is a strong possibility of a runtime module that is made to belong to a hook layer because of the extension of functionality not being fixed. For this reason, a problem with the configuration and update management of the hook layer is inevitably magnified. Furthermore, since the information of an exception module based on the configuration of an OS and the configuration of main and lower versions may be added, the verification of the patches of an OS becomes very important. Meanwhile, the scheme for directly calling the addresses of an original API is problematic in that it is difficult to provide support to a module, the modification of the source of which is impossible, such as a third party module inside the hook layer, and, in particular, in that a program becomes complicated in proportion to the number of hook target APIs.

In order to solve the above problem, exception handling has been hitherto performed using the path of a file image, the pattern of a file image and the pattern of the issuer of an electronic signature depending on the decision of a developer. In this case, the burden of accurate list management is reduced, but the burden of the addition of a new module and the burden of the management of a list of a third-party module and the lower layer modules of a hook layer still remain.

DISCLOSURE

Technical Problem

A technical object of the present invention is to provide a device that is capable of preventing hook re-entry attributable to the re-calling of the original function of a lower function upon dynamic API hooking.

A technical object of the present invention is to provide a computer-readable recording medium recording a program for executing, on a computer, a method for preventing hook re-entry attributable to the re-calling of the original function of a lower function upon dynamic API hooking.

Technical Solution

In order to accomplish the above object, in accordance with a preferred embodiment of the present invention, there is provided a hook re-entry prevention device for preventing hook re-entry that is defined as recursive execution of a hook that is code used to execute hooking upon dynamic API hooking, the device including a state information management module configured to selectively set and release a state information flag representative of whether a hook function that is called at a point of time at which the dynamic API hooking is started has been called; and a re-entry prevention module configured to determine that calling of the hook function has been performed during execution of the hook if the state information flag has been set upon the calling of the hook function and then execute a program, execution of which has been originally requested.

In order to accomplish another object, in accordance with an embodiment of the present invention, there is provided a computer-readable recording medium recording a program for executing, on a computer, a method of preventing hook re-entry that is defined as recursive execution of a hook that is code used to execute hooking upon dynamic API hooking, the method including (a) checking a value of a state information flag set in function information corresponding to a hook function if the hook function that is called at a point of time at which the dynamic API hooking is started is called by an original function or a lower function that is executed during the execution of the hook; and (b) determining that the calling of the hook function has been performed by the original function if a value of the state information flag has not been set and then setting the value of the state information flag, and determining that the calling of the hook function has been performed during the execution of the hook if the value of the state information flag has been set and then executing a program, execution of which has been originally requested.

Advantageous Effects

In accordance with a hook re-entry prevention device and a recording medium recording a program for executing a hook re-entry prevention method on a computer according to the present invention, they function as an entry/exit layer independent of a hook layer, and thus the hook layer can be safely isolated from a hook, thereby preventing hook re-entry attributable to the re-calling of the original function of a lower function during the execution of a hook routine in the hook layer upon dynamic API hooking. Furthermore, a structure for determining the re-entry of a hook at the start point of entry from an application program to a hook layer is provided, thereby reducing the burden of writing code for preventing hook re-entry upon writing a program.

MODE FOR INVENTION

Preferred embodiments of a hook re-entry prevention device and a recording medium recording a program for executing a hook re-entry prevention method on a computer according to the present invention will be described in detail below with reference to the accompanying drawings.

Figure 4:
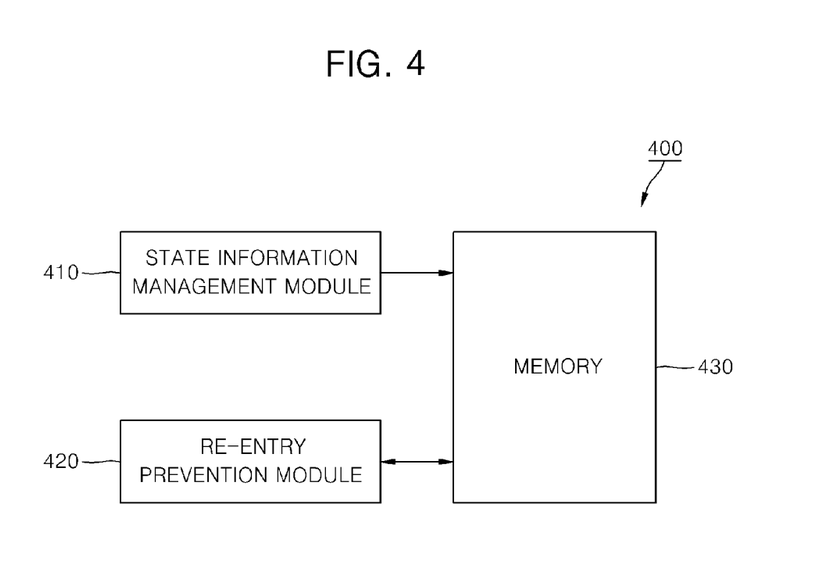
FIG. 4 is a diagram illustrating the configuration of a preferred embodiment of a hook re-entry prevention device according to the present invention.

FIG. 4 is a diagram illustrating the configuration of a preferred embodiment of a hook re-entry prevention device according to the present invention.

Referring to FIG. 4, a preferred embodiment 400 of a hook re-entry prevention device according to the present invention includes a state information management module 410 and a re-entry prevention module 420.

The state information management module 410 determines a point from which a hook function has been called based on the value of a state information flag at the time at which the hook function that is run by the calling of the original function of an application is called. In this case, there is a need for the establishment of a minimum unit that can identify whether the calling of an original function has been performed inside or outside the hook layer. In the present invention, a thread is used as an identification unit, the reasons for which are as follows. Every function belongs to a single thread at the time at which it is run. A function on a thread at an arbitrary point of time is present inside or outside of the hook layer. Furthermore, the case in which the function on the thread has two states and does not correspond to the two states at the same time does not occur. In addition, except for a thread generated inside the hook layer, all functions that are executed after entry into the hook layer are lower functions of a function that has entered the hook layer on a unit thread basis. Such value of a state information flag is set in function information corresponding to a hook function, and is stored in memory 430. In this case, the value of a state information flag is set in a global data variable that can perform identification for each thread, thread local storage (TLS) that can manage information for each thread, a static data variable that can manage information for each thread, and other data objects (for example, Worker thread, Singleton object, and the like) that can manage information for each thread. Furthermore, the state information management module 410 sets or releases the value of the state information flag in the memory 430 in which the corresponding value has been stored, and the re-entry prevention module 420 reads the value of the state information flag from the memory 430 in which the corresponding value has been stored. For this purpose, the state information flag should assume at least a Boolean form so as to identify entry/exit information.

If the value of a state information flag has not been set in function information corresponding to a hook function, the state information management module 410 determines that the hook function has been called from the outside of a hook layer, and sets the value of the state information flag. In contrast, if the value of a state information flag has been set in function information corresponding to a hook function, the state information management module 410 determines that the hook function has been called from the inside of a hook layer. Furthermore, the state information management module 410 releases the value of the state information flag set in the function information corresponding to the hook function when a result value that is obtained by the execution of the last lower function of the hook routine is returned to a system layer.

Figure 5:
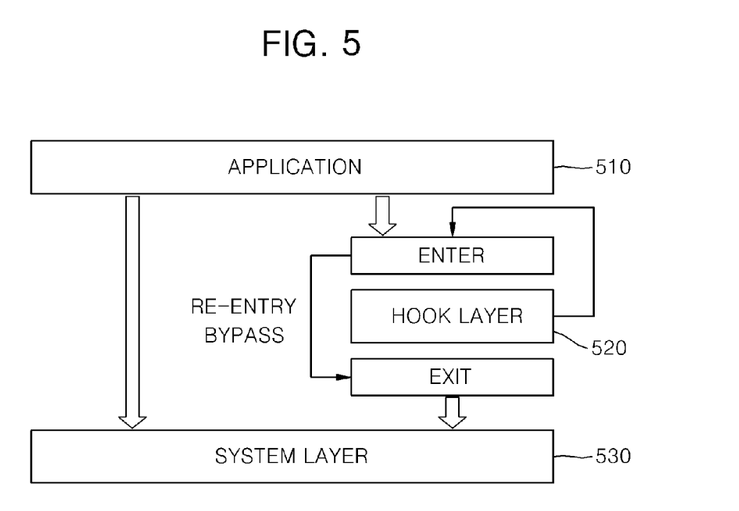
FIG. 5 is a diagram illustrating an API call branching process that is performed by a re-entry prevention module 330 based on the value of a state information flag.

The re-entry prevention module 420 selectively performs the execution of the hook routine and exit from the hook layer based on the value of a state information flag corresponding to the hook function recorded in the memory 430 upon the re-calling of the hook function. FIG. 5 illustrates an API call branching process that is performed by the re-entry prevention module 420 based on the value of a state information flag.

Referring to FIG. 5, for the re-entry prevention module 420, a hook function that is the starting point of entry from an application 510 to a hook layer 520 is an entry point, and a location at which the hook layer 520 calls the original API of a lower layer and proceeds to a system layer 530 is an exit point. Here, the entry point for the hook layer 520 is identical to a call point for the hook function. A structure that explicitly calls an original function at a programming step in order to implement an exit point is processed together at an entry point in the present invention, because of the problem of being implemented for all modules, as described above.

The above-described preferred embodiment 400 of the hook re-entry prevention device according to the present invention includes a plurality of components that correspond to execution units. However, in an implementation, the state information management module 410 and the re-entry prevention module 420 may be integrated into a single module. In this case, the hook re-entry prevention device according to the present invention is located between a system layer and a hook layer, and executes a hook routine on the hook layer or assumes the form of a filter that returns a value to the system layer depending on whether a state information flag has been set.

Figure 6:
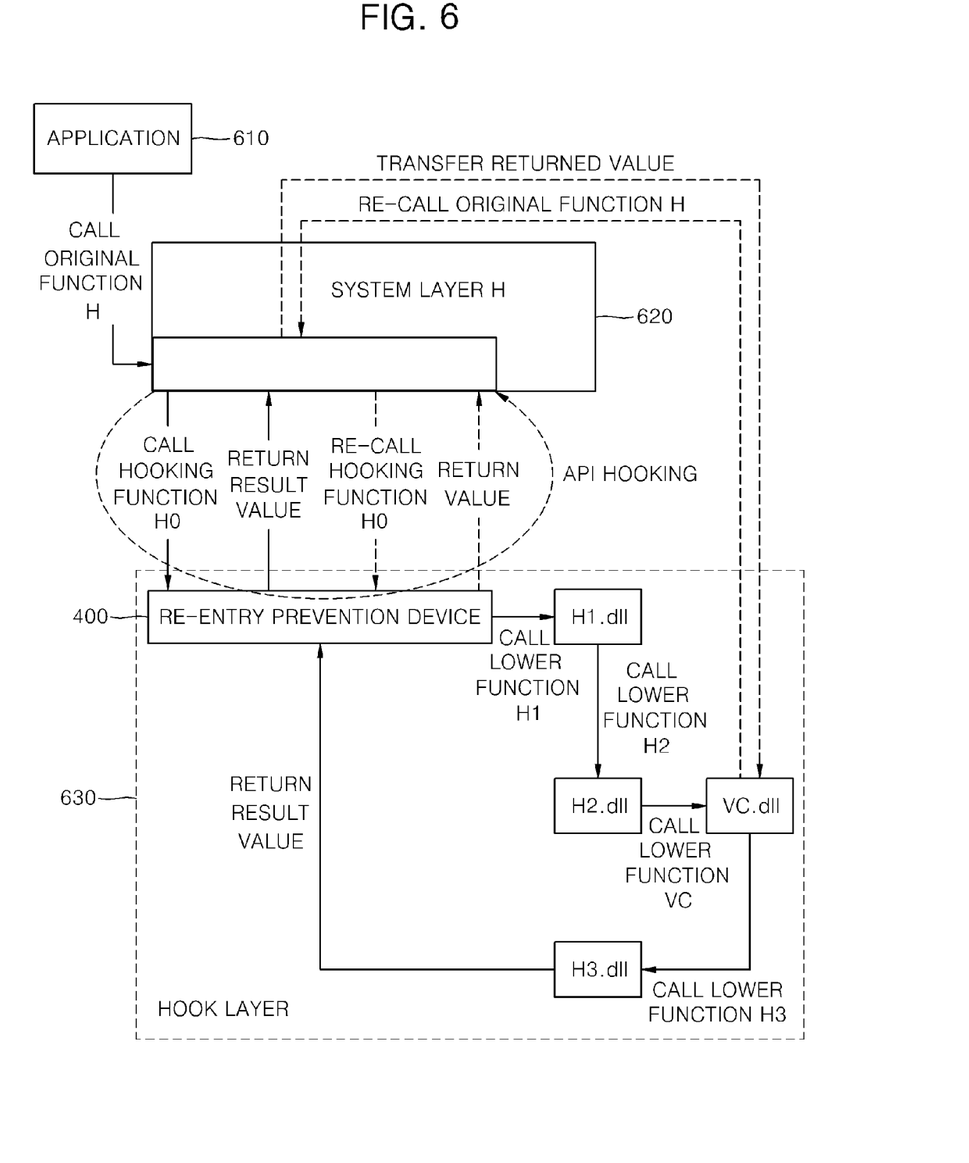
FIG. 6 is a diagram illustrating a hook re-entry prevention process that is performed by a re-entry prevention module 330.
Figure 7:
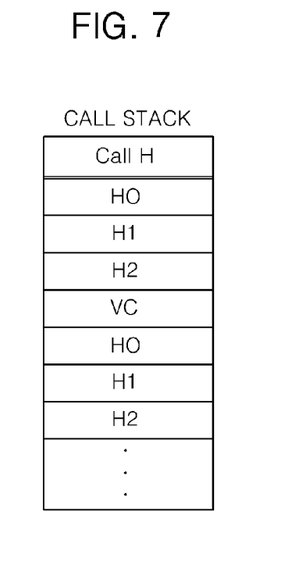
FIGS. 7 and 8 are diagrams illustrating a call stack in an API hooking technique that does not take into consideration hook re-entry, and a call stack according to the present invention, respectively.
Figure 8:
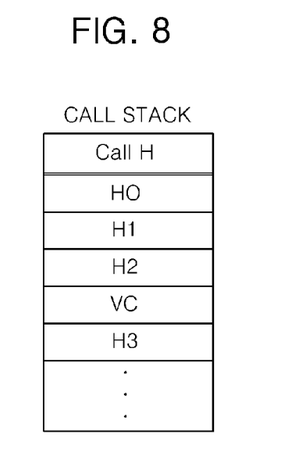

In FIG. 6, a hook re-entry prevention process that is performed by the re-entry prevention module 420 is illustrated. Referring to FIG. 6, when an application 610, that is, a caller, calls an original function H on a system layer 620, the hook layer 630's own hook routine (that is, lower functions H0, H1, H2, VC and the like) is executed by dynamic API hooking. In this process, if the lower function VC calls the original function H again, an API hooking technique that does not take into consideration hook re-entry experiences the problem of the lower functions H0, H1, H2, VC and the like being executed again, as can be seen from a call stack illustrated in FIG. 7. In contrast, in the present invention, the state information management module 410 sets the value of the state information flag of function information corresponding to the hook function H0. Thereafter, when the hook function H0 is called as the lower function VC calls the original function H again, the re-entry prevention module 420 checks the value of the state information flag of the hook function H0, and then returns the value to the system layer 620. Furthermore, the system layer 620 returns the value to the lower function VC, and the subsequent lower function H3 is executed in accordance with a hook routine that is scheduled after the function VC has been called. In FIG. 8, a call stack that is used when the hook re-entry prevention process according to the present invention is performed is illustrated.

Figure 9:
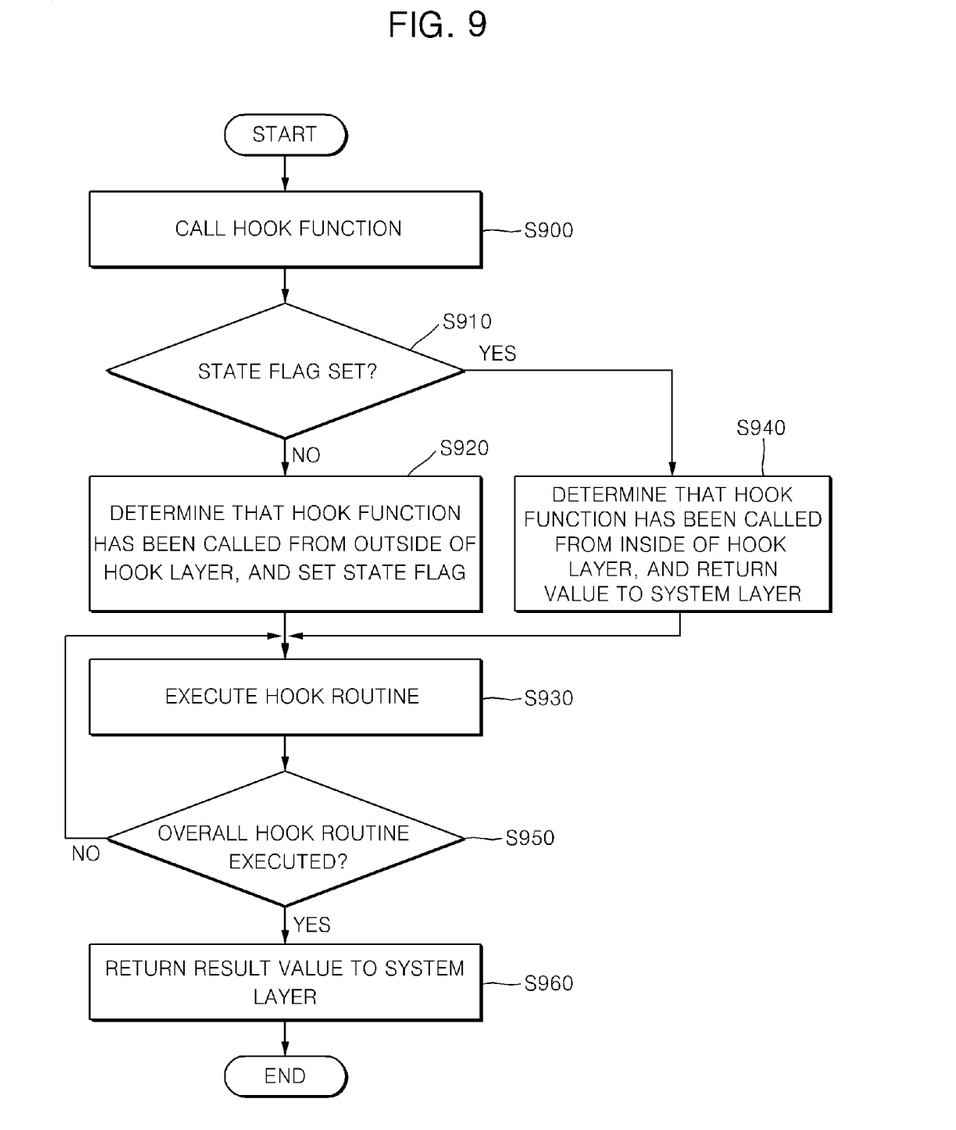
FIG. 9 is a flowchart illustrating a process in which a preferred embodiment of a hook re-entry prevention method according to the present invention is performed.

FIG. 9 is a flowchart illustrating a process in which a preferred embodiment of a hook re-entry prevention method according to the present invention is performed.

Referring to FIG. 9, when the application 610 is run by calling an original function, or when a hook function is called by the calling of a lower function at step S900, the hook re-entry prevention device 400 checks the value of a state information flag set in function information corresponding to the hook function at step S910. If the value of the state information flag has not been set, the hook re-entry prevention device 400 determines that the hook function has been called from the outside of a hook layer and then sets the value of the state information flag at step S920. In this case, lower functions based on a hook routine are sequentially executed at step S930. In contrast, if the value of the state information flag has been set, the hook re-entry prevention device 400 determines that the hook function has been called from the inside of the hook layer and then returns the value to the system layer 620 at step S940. Accordingly, in this case, the system layer 620 returns the value to the lower function VC, and then a subsequent lower function is executed in accordance with the hook routine at step S930. Thereafter, if a result value obtained by the execution of the last lower function of the hook routine is input at step S950, the hook re-entry prevention device 400 returns the result value to the system layer 620 at step S960.

Meanwhile, the above-described embodiment of the hook re-entry prevention device and method according to the present invention sets the value of the state information flag of function information corresponding to the hook function initial entry from the outside to the hook layer, re-entry can be prevented based on the value of the state information flag of the function information corresponding to the hook function when the hook function is called again from the outside of the hook layer as a hook routine is executed. However, the above-described embodiment of the hook re-entry prevention device and method according to the present invention is problematic in that a re-entry prevention function is not performed when the hook function is called again by a thread generated inside the hook layer. Accordingly, in order to also provide a re-entry prevention function to a thread generated inside the hook layer, a configuration for monitoring the generation of a thread and setting an identification flag for the generated thread should be additionally provided.

Figure 10:
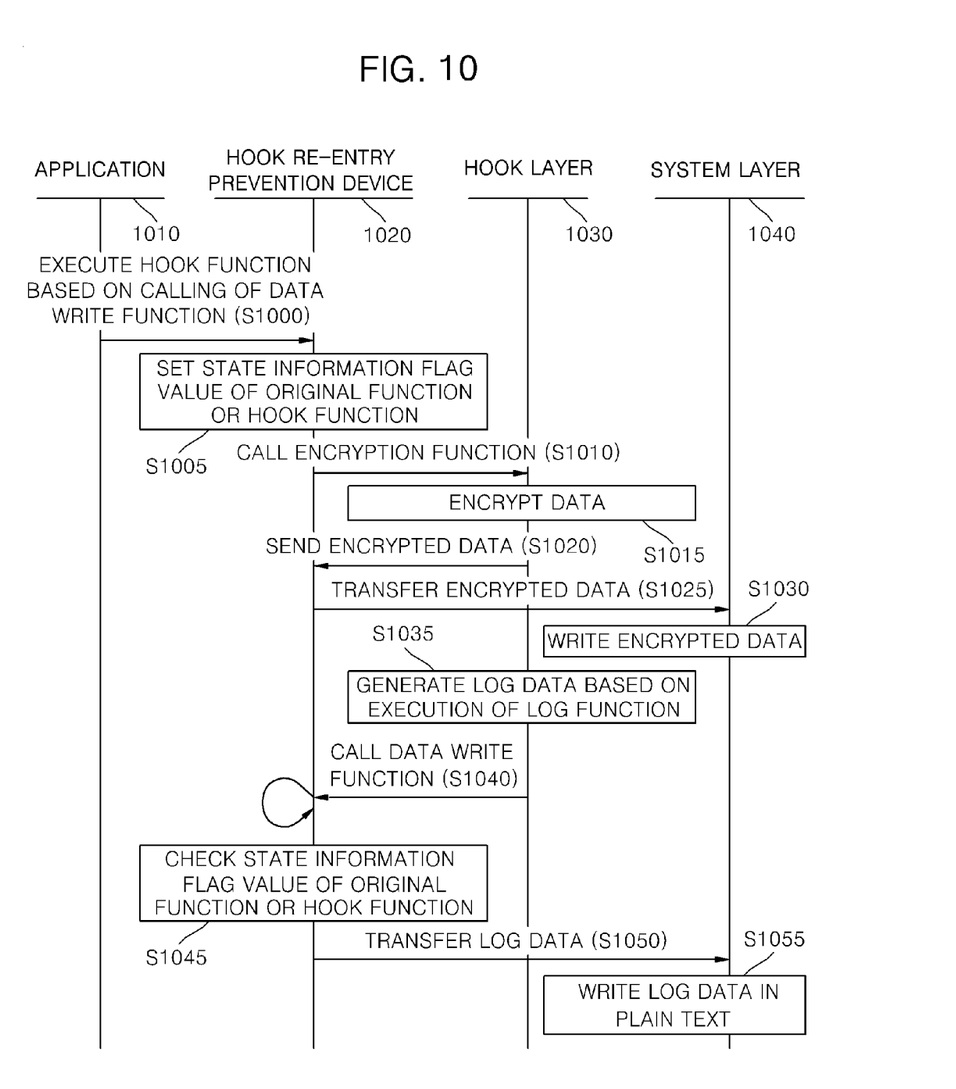
FIG. 10 is a diagram illustrating an execution process that is performed when there is no thread that is generated inside a hook layer, in the hook re-entry prevention device and method according to the present invention.

FIG. 10 is a diagram illustrating an execution process that is performed when there is no thread that is generated inside a hook layer, in the hook re-entry prevention device and method according to the present invention. An embodiment shown in FIG. 10 includes an additional log function that is used to log the operating state of a hook function in a file in a hook function executing process that monitors file input and output and encrypts generated file data.

Referring to FIG. 10, when a hook function is called as an application 1010 calls a data write function at step S1000, a hook re-entry prevention device 1020 sets the value of a state information flag (or the value of a state information flag corresponding to the hook function) corresponding to the data write function, that is, an original function, at step S1005. Thereafter, an encryption function for data is called in accordance with a hook routine set in a hook layer 1030 at step S1010, and the data is encrypted using the encryption function at step S1015. Furthermore, the hook re-entry prevention device 1020 receives the encrypted data from the hook layer 1030 at step S1020, and transfers the encrypted data to a system layer 1040 at step S1025. Thereafter, a system layer 1040 records the data in memory at step S1030. Meanwhile, log data related to the write operation for the data is generated by a log function in accordance with the hook routine set in the hook layer 1030 at step S1035, and the data write function for writing the generated log data in memory is called again at step S1040. The hook function is also called again by the re-calling of the data write function, and the hook re-entry prevention device 1020 checks the value of a state information flag corresponding to the data write function (or the value of a state information flag corresponding to the hook function) at step S1045. Since the value of a state information flag corresponding to the data write function (or the value of a state information flag corresponding to the hook function) has been previously set at the preceding step S1005, the hook re-entry prevention device 1020 prevents entry into the hook routine and transfers the log data to the system layer 1040 at step S1050. Thereafter, the system layer 840 records the log data in the memory at step S1055. Since re-entry by the log function is prevented by the above-described operation, the log data may be stored in plain text without being encrypted.

Figure 11:
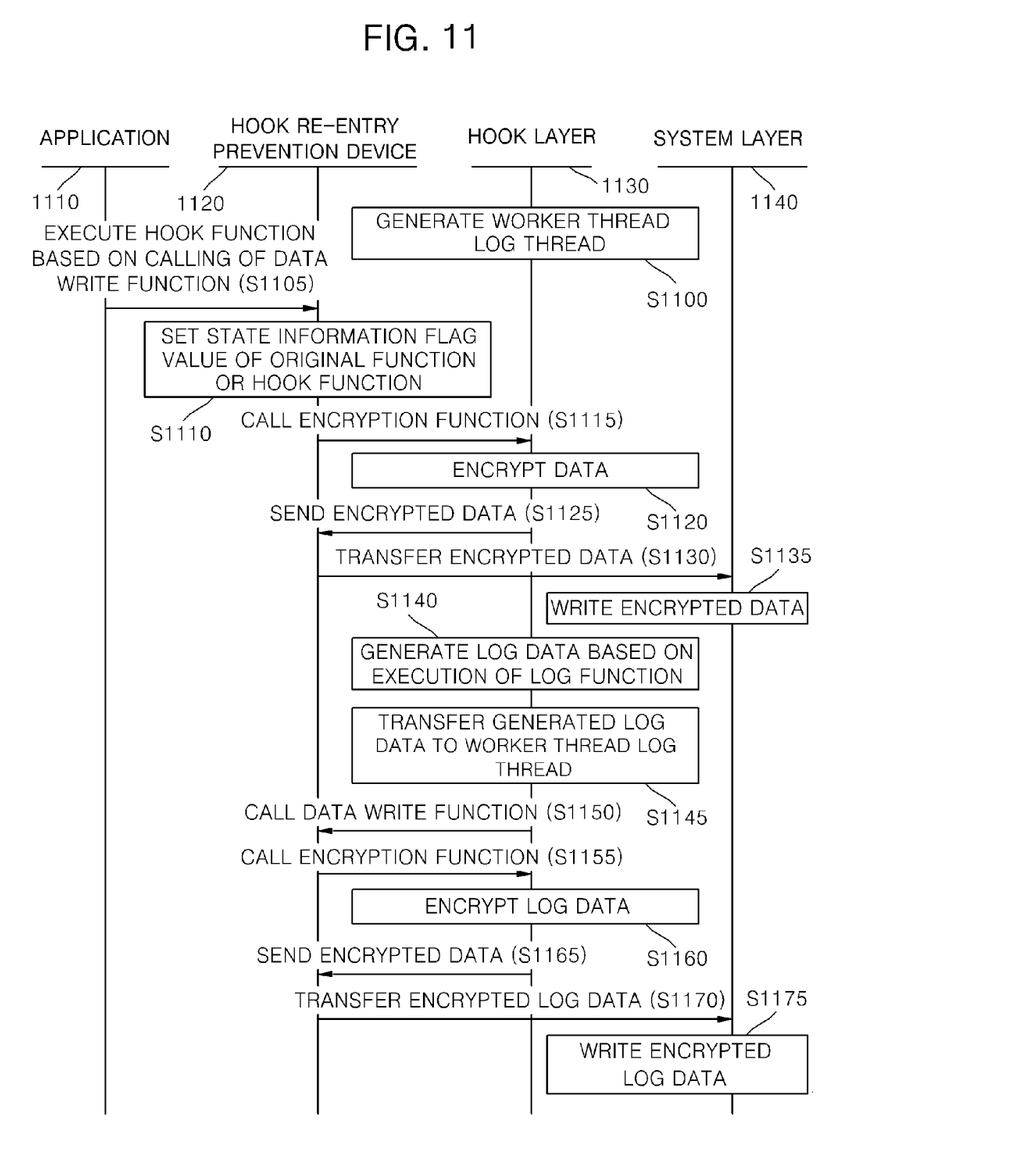
FIG. 11 is a diagram illustrating a process that is performed when there is a thread that is generated inside a hook layer, in the hook re-entry prevention device and method according to the present invention.

FIG. 11 is a diagram illustrating a process that is performed when there is a thread that is generated inside a hook layer, in the hook re-entry prevention device and method according to the present invention. An embodiment illustrated in FIG. 11 includes an additional log function that records the operating state of the hook function in a file during the execution of the hook function that monitors file input/output and encrypts generated file data, and the log function internally sends the log data to Worker Thread LogThread. Here, Worker Thread LogThread brings about input/output inside the hook layer.

Referring to FIG. 11, first, Worker Thread LogThread is generated inside the hook layer 1130 at step S1100. Thereafter, when a hook function is called as an application 1110 calls a data write function at step S1105, the hook re-entry prevention device 1120 sets the value of a state information flag corresponding to the data write function, that is, an original function, (or the value of a state information flag corresponding to the hook function) at step S1110. Thereafter, an encryption function for data is called in accordance with a hook routine set in the hook layer 1130 at step S1115, and the data is encrypted by the encryption function at step S1120. Furthermore, when the encrypted data is received from the hook layer 1130 at step S1125, the hook re-entry prevention device 1120 transfers the encrypted data to the system layer 1140 at step S1130. Thereafter, the system layer 1140 records the data in memory at step S1135.

Meanwhile, the called log function generates log data related to a write operation for the data in accordance with the hook routine set in the hook layer 1130 at step S1140. Furthermore, the log function sends the log data to Worker Thread LogThread inside the hook layer 1130 at step S1145. Thereafter, Worker Thread LogThread calls a data write function to write the log data generated inside the hook layer 1130 to memory at step S1150. Although the hook function is also called again by the re-calling of the data write function, the hook re-entry prevention device 1120 cannot recognize this as re-entry because the re-calling of the data write function (or the hook function) is not the entry from the outside of the hook layer 1130. Accordingly, the hook re-entry prevention device 1120 calls an encryption function at step S1155, and the called encryption function encrypts the log data at step S1160. Furthermore, when the encrypted log data is received from the hook layer 1130 at step S1165, the hook re-entry prevention device 1120 transfers the received encrypted log data to the system layer 1140 at step S1170. Thereafter, the system layer 1140 records the data in memory at step S1175.

As described with reference to FIGS. 10 and 11, the embodiments of the hook re-entry prevention device and method according to the present invention have the problem of not preventing hook re-entry when the original function (or the hook function) is called again by a thread generated inside the hook layer. In order to overcome this problem, a component that monitors the generation of a thread is required.

Figure 12:
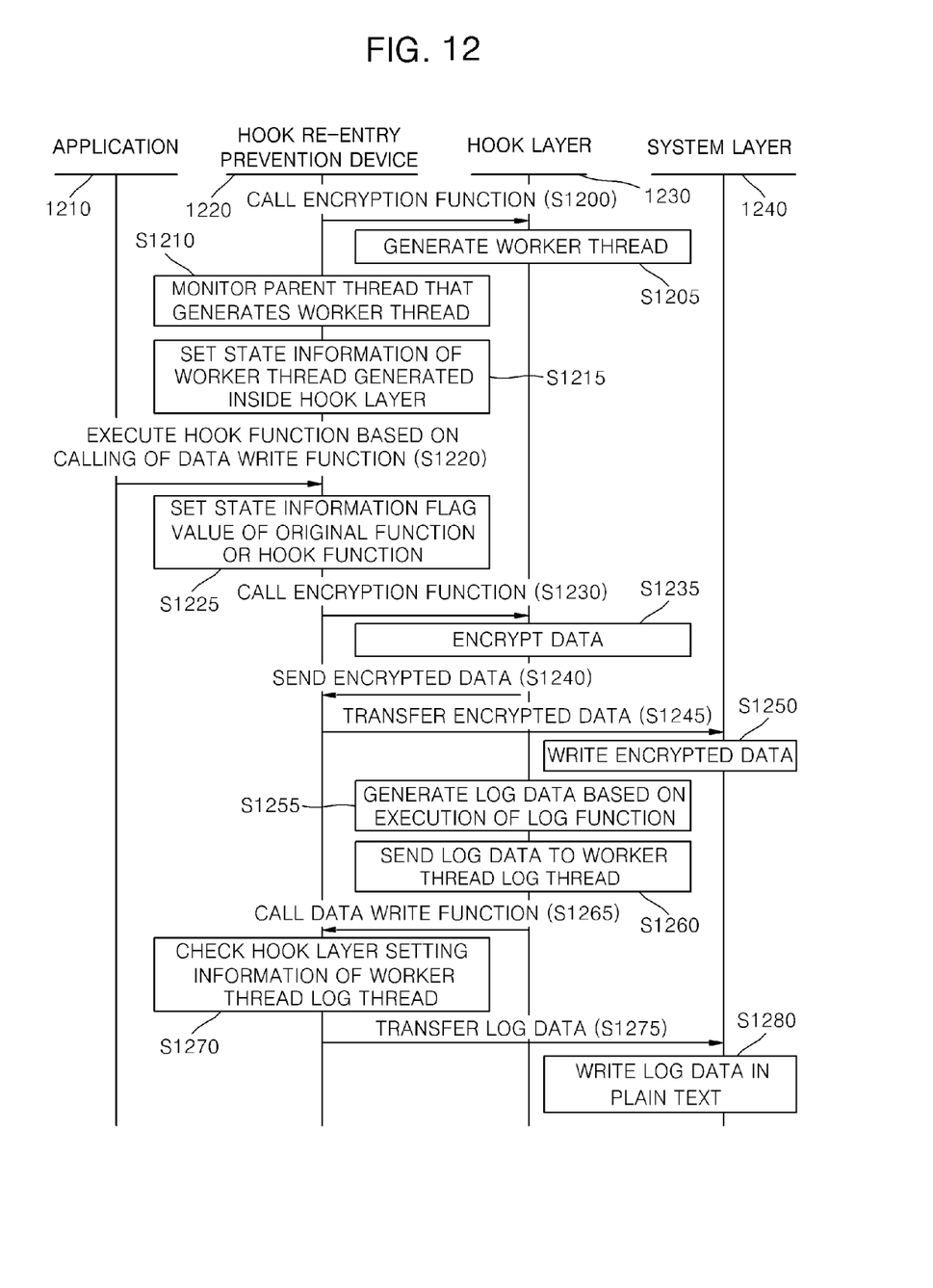
FIG. 12 is a diagram illustrating a hook re-entry prevention process according to another embodiment of the hook re-entry prevention device and method according to the present invention.

FIG. 12 is a diagram illustrating a hook re-entry prevention process according to another embodiment of the hook re-entry prevention device and method according to the present invention. The device that performs the hook re-entry prevention process shown in FIG. 12 includes a thread generation detection module in addition to the components of the embodiment shown in FIG. 3.

Referring to FIG. 12, first, the hook re-entry prevention device 1220 initializes the state of the hook layer at step S1200, and Worker Thread is generated inside the hook layer 1230 at step S1205. Furthermore, the hook re-entry prevention device 1220 determines whether the state of Parent Thread is the inside or outside of the hook layer 1230 by monitoring Parent Thread that generates Worker Thread at step S1210. Furthermore, the hook re-entry prevention device 1220 causes the hook layer setting information of Child Thread that is generated when Parent Thread is in the state of being inside the hook layer 1230 to inherit the setting information of Parent Thread at step S1215. This operation is performed by the thread generation detection module. Here, the thread generation detection module detects whether a specific thread has been generated inside or outside the hook layer 1230 by setting the state information of Parent Thread to "entry" at the time at which the thread is generated inside the hook layer 1230 or tracking the stack information of Parent Thread at the time at which the thread is generated. In addition, the thread generation detection module should monitor thread generation APIs (for example, in a Win32 system, CreateThread, _beginthread, _beginthreadex and the like), so as to check the generation of a thread, and further should be able to monitor the generation of all threads.

Thereafter, when a hook function is called as an application 1210 calls a data write function at step S1220, the hook re-entry prevention device 1220 sets the value of a state information flag corresponding to the data write function, that is, an original function, (or the value of a state information flag corresponding to the hook function) at step S1225. Thereafter, an encryption function for the data is called in accordance with a hook routine set in the hook layer 1230 S1230, and the data is encrypted by the encryption function at step S1235. Furthermore, the hook re-entry prevention device 1220 receives the encrypted data from the hook layer 1230 at step S1240, and transfers the encrypted data to the system layer 1240 at step S1245. Thereafter, the system layer 1040 records the data in memory at step S1250.

Meanwhile, a log function that is called in accordance with the hook routine set in the hook layer 1230 generates log data related to the write operation for the data at step S1255. Furthermore, the log function sends log data to Worker Thread LogThread inside the hook layer 1230 at step S1260. Thereafter, a Worker Thread LogThread function calls a data write function so as to write the log data generated inside the hook layer 1230 to memory at step S1265. In this case, the hook function is also called again by the re-calling of the data write function, and the hook re-entry prevention device 1220 checks the hook layer setting information of the Worker Thread LogThread function at step S1270. Since the setting information of the Worker Thread LogThread function has been previously set to "entry" at the preceding step S1215, the hook re-entry prevention device 1220 prevents entry into the hook routine and transfers the log data to the system layer 1240 at step S1275. Thereafter, the system layer 1240 records the log data in memory at step S1280. Since re-entry by the log function is prevented by the above-described operation, the log data may be stored in plain text without being encrypted.

The present invention may be implemented as computer-readable code on a computer-readable recording medium. The computer-readable recording medium includes all types of storage devices in which computer system-readable data is stored. Examples of the computer-readable recording medium include Read Only Memory (ROM), Random Access Memory (RAM), Compact Disk-Read Only Memory (CD-ROM), magnetic tape, a floppy disk, and an optical data storage device. Furthermore, the computer-readable recording medium may be implemented as carrier waves (for example, in the case of transmission over the Internet). Moreover, the computer-readable medium may be distributed across computer systems connected via a network, so that computer-readable code can be stored and executed in a distributed manner.

Although the preferred embodiments of the present invention have been illustrated and described, the present invention is not limited to the above-described specific preferred embodiments, and those having ordinary knowledge in the technical field to which the present invention pertains can make various modifications and variations without departing from the gist of the present invention that is claimed in the attached claims. Such modifications and variations fall within the scope of the claims.

The invention claimed is:

1. A device for preventing hook re-entry defined as recursive execution of a hook function executed by dynamic API hooking, the device comprising:
   at least one processor operable to read and operate according to instructions within a computer program; and
   at least one memory operable to store at least portions of said computer program for access by said processor,
   wherein said program includes algorithms to cause said processor to implement:
   a state information management module configured to set a value of a state information flag corresponding to the hook function to a first value at a point of time when a system layer calls the hook function in response to a call for an original function by an application program; and
   a re-entry prevention module configured to check the value of the state information flag when the hook function is called, and to forward a resulting value which is an output value of a first sub-function which calls the hook function to the system layer so as to cause the system layer to induce execution of one or more remaining sub-functions by returning the resulting value to a second sub-function out of the remaining sub-functions right behind the first sub-function in an execution order when the value of the state information flag is the first value,
   wherein a hook routine is composed of the first sub-function and the remaining sub-functions and performed on a hook layer,
   wherein the state information management module sets the value of the state information flag to a second value, when or after the hook routine is terminated.

2. The device of claim 1, wherein the value of the state information flag is recorded in a global data variable, thread local storage, a static data variable or a data object that is identifiable for each thread in response to the hook function.

3. The device of claim 2, further comprising a thread generation detection module configured to set a value of a state information of a thread to the first value at a point of time when the thread is generated during the execution of the hook routine,
   wherein the re-entry prevention module determines that the calling of the hook function has been performed during the execution of the hook routine when the hook function is called by the thread of which value of the state information is the first value by the thread generation detection module.

4. The device of claim 1, further comprising a thread generation detection module configured to set a value of a state information of a thread to the first value at a point of time when the thread is generated during the execution of the hook routine,
   wherein the re-entry prevention module determines that the calling of the hook function has been performed during the execution of the hook routine when the hook function is called by the thread of which value of the state information is the first value by the thread generation detection module.

5. A non-transitory computer-readable recording medium recording a program for executing instructions performing a method of preventing hook re-entry defined as recursive execution of a hook function executed by dynamic API hooking, the method comprising:
   (a) setting a value of a state information flag corresponding to the hook function to a first value at a point of time when a system layer calls the hook function in reponse to a call for an original function by an application program;
   (b) checking the value of the state information flag set in function information corresponding to the hook function when the hook function is called;
   (c) forwarding a resulting value which is an output value of a first sub-function which calls the hook function to the system layer so as to cause the system layer to induce execution of one or more remaining sub-functions by returning the resulting value to a second sub-function out of the remaining sub-functions right behind the first sub-function in an execution order when the value of the state information flag is the first value; and
   (d) setting the value of the state information flag to a second value when or after the hook routine is terminated,
   Wherein a hook routine is composed of the first sub-function and the remaining sub-functions and performed on a hook layer.

6. The non-transitory computer-readable recording medium of claim 5, wherein the value of the state information flag is recorded in a global data variable, thread local storage, a static data variable or a data object that is identifiable for each thread in response to the hook function.

7. The non-transitory computer-readable recording medium of claim 6, wherein the method further comprises setting a value of a state information of the thread to the first value during the execution of the hook routine,
   wherein step (b) comprises determining that the calling of the hook function has been performed during the execution of the hook routine when the hook function is called by the thread of which value of the state information is the first value.

8. The non-transitory computer-readable recording medium of claim 5, wherein the method further comprises setting a value of a state information of the thread to the first value during the execution of the hook routine,
   wherein step (b) comprises determining that the calling of the hook function has been performed during the execution of the hook routine when the hook function is called by the thread of which value of the state information is the first value.

* * * * *